(12) United States Patent
Laukhuf

(10) Patent No.: US 8,704,107 B2
(45) Date of Patent: Apr. 22, 2014

(54) ELECTRICAL BOX WITH ADJUSTABLE MOUNTING SYSTEM

(75) Inventor: Gregg E. Laukhuf, Bryan, OH (US)

(73) Assignee: Allied Moulded Products, Inc., Bryan, OH (US)

( * ) Notice: Subject to any disclaimer, the term of this patent is extended or adjusted under 35 U.S.C. 154(b) by 339 days.

(21) Appl. No.: 12/948,109

(22) Filed: Nov. 17, 2010

(65) Prior Publication Data

US 2011/0114382 A1 May 19, 2011

Related U.S. Application Data

(60) Provisional application No. 61/261,789, filed on Nov. 17, 2009.

(51) Int. Cl.
| | |
|---|---|
| *H01R 13/46* | (2006.01) |
| *H05K 5/00* | (2006.01) |
| *H01H 9/02* | (2006.01) |
| *H01H 13/04* | (2006.01) |
| *H01H 19/04* | (2006.01) |
| *H01H 21/04* | (2006.01) |
| *H01H 23/04* | (2006.01) |
| *H05K 7/14* | (2006.01) |
| *H02G 3/08* | (2006.01) |

(52) U.S. Cl.
USPC .............. 174/520; 174/58; 174/535; 220/3.9

(58) Field of Classification Search
CPC ........... H02G 3/10; H02G 3/105; H02G 3/12; H02G 3/121; H02G 3/123; H02G 3/125; H02G 3/126; H02G 3/128; H02G 3/14; H02G 3/16; H02G 3/18; H02G 3/185; H05K 7/1407; H01H 9/0207; Y10S 248/906
USPC ........... 174/58, 520, 521, 535, 50, 53, 54, 61, 174/481; 220/3.2, 3.6, 3.7, 3.9, 3.92; 248/906, 909, 200.1, 205.1, 229.12
See application file for complete search history.

(56) References Cited

U.S. PATENT DOCUMENTS

| | | | | | |
|---|---|---|---|---|---|
| 2,299,674 | A | * | 10/1942 | Austin, Jr. ..................... | 220/3.5 |
| 2,406,587 | A | * | 8/1946 | Cooper ......................... | 220/3.9 |
| 2,788,188 | A | * | 4/1957 | Smith et al. .................. | 248/57 |
| 2,930,564 | A | * | 3/1960 | Maier ........................... | 248/906 |
| 5,044,582 | A | * | 9/1991 | Walters ........................ | 248/343 |
| 5,378,854 | A | * | 1/1995 | Hoover ........................ | 220/3.92 |
| 5,624,202 | A | * | 4/1997 | Grierson ...................... | 248/343 |
| 6,909,045 | B2 | * | 6/2005 | Halbert ........................ | 248/906 |
| 7,214,875 | B1 | | 5/2007 | Gretz | |

(Continued)

*Primary Examiner* — Timothy Thompson
*Assistant Examiner* — Roshn Varghese
(74) *Attorney, Agent, or Firm* — Fraser Clemens Martin & Miller LLC; J. Douglas Miller

(57) ABSTRACT

An electrical box assembly is disclosed including an electrical box having at least one sidewall, the sidewall including an aperture formed therein to receive a threaded fastener. A mounting plate is provided that is attached to a support member and includes an elongate slot formed therein, wherein at least a portion of the slot is aligned with the aperture of the sidewall. A clamp bar abuts the mounting plate and has a threaded aperture formed therein, wherein the fastener extends through the aperture formed in the sidewall and the elongate slot formed in the mounting plate and is threadably received in the aperture formed in the clamp bar to movably attach the electrical box to the mounting plate.

20 Claims, 4 Drawing Sheets

(56) References Cited

U.S. PATENT DOCUMENTS

Figure 1:
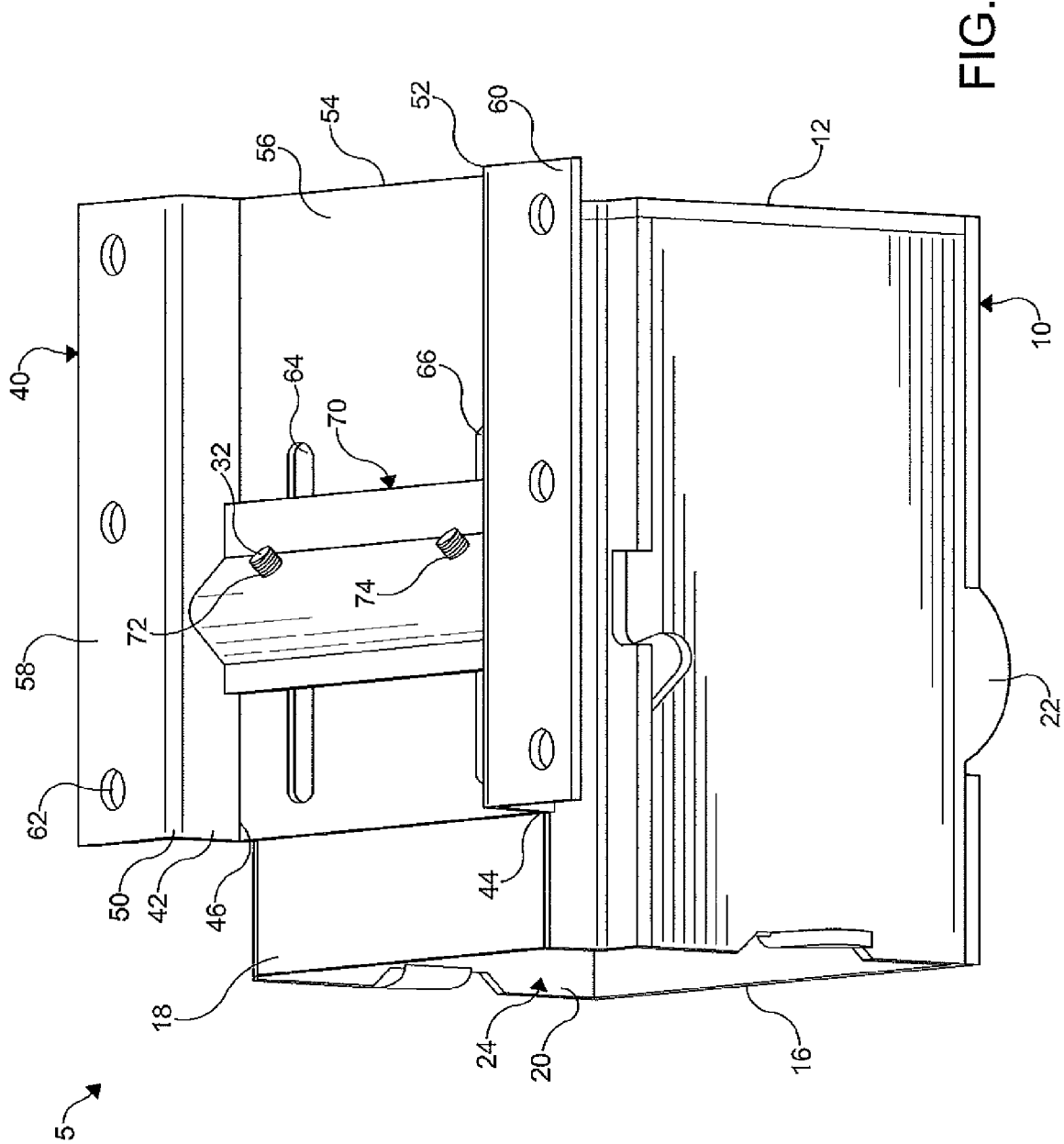

| | | |
|---|---|---|
| 7,307,212 B1 | 12/2007 | Gretz |
| 7,307,213 B1 | 12/2007 | Gretz |
| 7,429,025 B1 * | 9/2008 | Gretz ............................ 248/546 |
| 7,476,807 B1 | 1/2009 | Gretz |
| 2011/0042138 A1 * | 2/2011 | Dutton ........................... 174/542 |

* cited by examiner

ELECTRICAL BOX WITH ADJUSTABLE MOUNTING SYSTEM

CROSS-REFERENCE TO RELATED APPLICATION

This application claims the benefit of priority of U.S. Provisional Patent Application Ser. No. 61/261,789 filed on Nov. 17, 2009 hereby incorporated herein by reference.

FIELD OF THE INVENTION

The present invention relates to an electrical box assembly and more particularly to an electrical box having an adjustable mounting system that facilitates a repositioning of the electrical box.

BACKGROUND OF THE INVENTION

Typically, an electrical box is used to support and contain electrical devices and wiring in a centralized space. The electrical box protects the wiring and electrical devices contained therein from extrinsic conditions such rain, snow, and fire, for example. A cover plate can be provided to further protect the wiring and electrical devices and militate against accidental contact with the wiring and devices. The electrical box is typically connected to a joist, a stud, or another structural component of a building.

Prior art electrical boxes include mounting systems with fastening devices that facilitate a connection to mounting structures. However, if a repositioning of the electrical box is desired, the fastening devices must be completely removed from the mounting structure. The electrical box is then repositioned and the fastening devices re-fastened to the mounting structure. This typically requires the formation of additional apertures in the mounting structure. Further, the repositioning process can be time consuming.

It would be desirable to produce an electrical box assembly including a mounting system which facilitates a repositioning of the electrical box, wherein an ease of repositioning the electrical box is maximized.

SUMMARY OF THE INVENTION

Concordant and congruous with the present invention, an electrical box assembly including a mounting system which facilitates a repositioning of the electrical box, wherein an ease of repositioning the electrical box is maximized, has surprisingly been discovered.

In one embodiment, an electrical box assembly comprises an electrical box having at least one sidewall and a front opening, the sidewall including an aperture formed therein to receive a threaded fastener; a mounting plate adapted to be attached to a support member, the mounting plate including an elongate slot formed therein, at least a portion of the slot aligned with the aperture of the sidewall; and a clamp bar abutting the mounting plate and having a threaded aperture formed therein, wherein the fastener extends through the threaded aperture formed in the sidewall and the elongate slot formed in the mounting bracket and is threadably received in the aperture formed in the clamp bar to adjustably attach the electrical box to the mounting plate.

In another embodiment, an electrical box assembly comprises an electrical box having at least one sidewall and a front opening, the sidewall including an aperture formed therein to receive a threaded fastener; a fastener bar including an aperture formed therein to receive the threaded fastener, the fastener bar received in an interior of the electrical box and abutting the sidewall, wherein the aperture of the fastener bar is aligned with the aperture of the sidewall; a mounting plate adapted to be attached to a support member, the mounting plate including an elongate slot formed therein, at least a portion of the slot aligned with the aperture of the sidewall and the aperture of the fastener bar; and a clamp bar abutting the mounting plate and having a threaded aperture formed therein, wherein the fastener extends through the aperture formed in the fastener bar, the aperture formed in the sidewall, and the elongate slot formed in the mounting plate and is threadably received in the threaded aperture formed in the clamp bar to adjustably attach the electrical box to the mounting plate.

In another embodiment, an electrical box assembly comprises an electrical box having at least one sidewall and a front opening, the sidewall including a pair of apertures formed therein, each aperture to receive a threaded fastener; a mounting plate adapted to be attached to a support member, the mounting plate including a pair of elongate slots formed therein, at least a portion of each slot aligned with one of the pair of apertures of the sidewall; and a clamp bar abutting the mounting plate and having a pair of threaded apertures formed therein, wherein a fastener extends through one of the apertures formed in the sidewall and one of the elongate slots formed in the mounting plate and is threadably received in one of the threaded apertures formed in the clamp bar and another fastener extends through the other aperture formed in the sidewall and the other elongate slot formed in the mounting plate and is threadably received in the other threaded aperture formed in the clamp bar to adjustably attach the electrical box to the mounting plate.

BRIEF DESCRIPTION OF THE DRAWINGS

The above advantages of the invention will become readily apparent to those skilled in the art from reading the following detailed description of an embodiment of the invention in the light of the accompanying drawings, in which:

FIG. 1 is a side perspective view of an electrical box assembly according to an embodiment of the invention;

FIG. 2 is a front perspective view of the electrical box assembly illustrated in FIG. 1;

FIG. 3 is an exploded front perspective view of the electrical box assembly illustrated in FIG. 1; and FIG. 4 is an exploded front perspective view of an electrical box assembly according to another embodiment of the invention.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

FIGS. 1-3 illustrate an electrical box assembly 5 according to an embodiment of the invention. The electrical box assembly 5 includes an electrical box 10, a removable sidewall 18 having fasteners 32 disposed therein, a mounting plate 40, and a clamp bar 70. The electrical box 10 includes a back wall 12 having an inner surface 14 and an outer surface (not shown), a pair of opposing sidewalls 16, 18, and a pair of opposing end walls 20, 22. The back wall 12, the side walls 16, 18, and the end walls 20, 22 cooperate to define a hollow interior space of the electrical box 10 having a front opening 24 permitting access to the interior space. As shown, the electrical box 10 is formed from independent parts assembled together. However, the electrical box 10 can be formed as a unitary structure.

In the illustrated embodiment, the back wall 12, the sidewalls 16, 18, and the end walls 20, 22 form a generally rectangularly shaped electrical box. It should be understood that the back wall 12, the side walls 16, 18, and the end walls 20, 22 can have other configurations, as desired, to provide alternate overall shapes to the electrical box 10. Further, the illustrated electrical box 10 is a gangable electrical box, wherein the back wall 12 and the end walls 20, 22 are integrally formed and at least one of the sidewalls 16, 18 can be removed from the electrical box 10. The back wall 12 and the end walls 20, 22 of the electrical box 10 can be coupled to the back wall and the end walls of another electrical box (not shown) to form a single electrical box from two electrical boxes. The back wall 12 and the end walls 20, 22 of the electrical box 10 can be coupled to the sidewalls 16, 18 of another electrical box by a mechanical means such as interlocking tabs and keys, other structure having detents to snap-fit the respective walls of each electrical box together, for example. It should be understood that more than two electrical boxes may be coupled together to form an electrical box of a desired size. It should be further understood that the electrical box can be a single piece, non-gangable electrical box.

The sidewall 18 includes an elongate protuberance 26 formed at a center portion therein, wherein the protuberance 26 extends into the interior space of the electrical box 10 when the sidewall 18 is assembled therewith. The protuberance 26 has a generally triangular cross-sectional shape. Apertures 28, 30 are formed in the protuberance 26. The apertures 28, 30 receive the threaded fasteners 32 therein. The apertures 28, 30 are formed in a surface of the protuberance 26 at an angle with respect to the sidewall 18 to result in a head of the fastener 32 extending outwardly from the protuberance 26 into the interior space and generally toward the opening 24 of the electrical box 10. The protuberance 26 can be formed in the sidewall 16 or in both of the sidewalls 16, 18, as desired. It should be understood that the protuberance 26 may have another cross sectional shape, such as ovular, circular, rectangular, and the like, as desired. It should also be understood that the protuberance 26 may be a tab or other portion of sidewall 18 that has been cut from the sidewall 18 and bent or formed at an angle with respect thereto, or the protuberance 26 may be a plurality of protuberances (not shown), each of the plurality of protuberances having an aperture formed therein.

The electrical box 10 typically includes openings (not shown) in at least one of the back wall 12, the sidewalls 16, 18, and the end walls 20, 22 to provide a passage for wires to be received in the interior of the electrical box 10. It should also be understood that the electrical box 10 typically includes other apertures and attachment members to couple switches, receptacles, cover plates, other electrical boxes, and the like to the electrical box 10.

The mounting plate 40 is provided to movably mount the electrical box 10 to a support member (not shown) such as a stud, a joist, or other structural component of a building, for example. The mounting plate 40 includes a pair of spaced apart walls 42, 44 having first edges 46, 48 and second edges 50, 52, respectively. A web 54 extends between and connects the walls 42, 44 at the first edges 46, 48. The web 54 forms a channel 56 between the walls 42, 44 and the support member when the mounting plate 40 is mounted to the support member. Flanges 58, 60 extend laterally outwardly from the respective second edges 50, 52 of the walls 42, 44 away from the channel 56. The flanges 58, 60 are substantially parallel to the web 54. A plurality of apertures 62 is formed in each of the flanges 58, 60. The apertures 62 are adapted to receive a fastener (not shown) such as a nail or a screw, for example, to attach the mounting plate 40 to the support member.

Spaced apart elongate slots 64, 66 are formed in the web 54. The slots 64, 66 are substantially parallel to the walls 42, 44. The slots 64, 66 are formed in the web 54 to align with the apertures 28, 30, respectively, formed in the protuberance 26.

The clamp bar 70 is provided to couple the electrical box 10 to the mounting plate 40. The clamp bar 70 is received in the channel 56 of the mounting plate 40. Apertures 72, 74 are formed in the clamp bar 70 adjacent the ends thereof and substantially aligned with the slots 64, 66 in the assembled position. Each of the apertures 72, 74 receives a threaded end of one of the threaded fasteners 32. The end of the threaded fasteners 32 extends outwardly from the interior of the electrical box 10, through the apertures 28, 30 and the slots 64, 66 and is threadably received in the apertures 72, 74 to slidably attach the electrical box 10 to the plate 40. A selected rotation of the fasteners 32 in respect of the apertures 72, 74 urges the clamp bar 70 toward the sidewall 18 resulting in a clamping force between the sidewall 18 and the clamp bar 70. The clamping force is employed to substantially secure the electrical box 10 at a desired position in respect of the plate 40. Prior to rotating the fasteners 32 to create the clamping force, the electrical box 10 may be moved forwardly or backwardly via the fasteners 32 disposed through the apertures 28, 30, the slots 64, 66, and the apertures 72, 74. Once the electrical box 10 is in a desired position, the fasteners 32 are tightened to employ the clamping force.

It should be understood that the electrical box assembly 5 can be adapted to slidably attach the electrical box 10 to the mounting plate 40 from the back wall 12, the sidewalls 16, 18, and the end walls 20, 22 of the electrical box 10. The illustrated electrical box assembly 5 is formed from a metallic material employing metal stamping and metal forming processes. However, other materials such as polymers or rubber, for example, and other processes such as injection molding, for example, can be used as desired.

In use, a user typically inserts the fasteners 32 through the apertures 28, 30 formed in the protuberance 26, the slots 64, 66 formed in the plate 40, and causes the threaded ends of the fasteners 32 to be threadably received in the apertures 72, 74 of the clamp bar 70 to slidably attach the electrical box 10 to the plate 40. The plate 40 is attached to the support member. The attachment of the electrical box 10 is achieved by inserting a fastener such as a nail or a screw, for example, through the apertures 62 formed in the flanges 58, 60 and causing the fasteners to penetrate the support member.

The electrical box 10 is positioned in a desired position in respect of the support member by sliding the fasteners 32 in the slots 64, 66 of the plate 40. When the electrical box 10 is in the desired position, the fasteners 32 can be further rotated in respect of the apertures 72, 74 formed in the clamp bar 70 to urge the clamp bar 70 toward the sidewall 18 and tighten the fasteners 32. When the fasteners 32 are substantially fully tightened, the web 54 of the mounting plate 40 is clamped between the sidewall 18 and the clamp bar 70, thus militating against relative movement between the electrical box 10 and the mounting plate 40 to substantially secure the electrical box 10 in the desired position to the support member.

In the event it is desired to adjust the position of the electrical box 10 in respect of the support member, the fasteners 32 can be loosened to reduce or substantially eliminate the clamping force between the sidewall 18 and the clamp bar 70. The electrical box 10 can be repositioned and the fasteners 32 re-tightened to re-secure the electrical box 10. It should be understood that the mounting plate 40 can first be attached to the support member and then slidably attached to the electrical box 10.

The electrical box assembly 5 permits a repositioning of the electrical box 10 in respect of the support member without a complete removal of the electrical box 10 and/or the mounting plate 40 from the support member. The electrical box assembly 5 is particularly suited for use in commercial construction applications, wherein the support member is a metal stud, for example.

Figure 2:
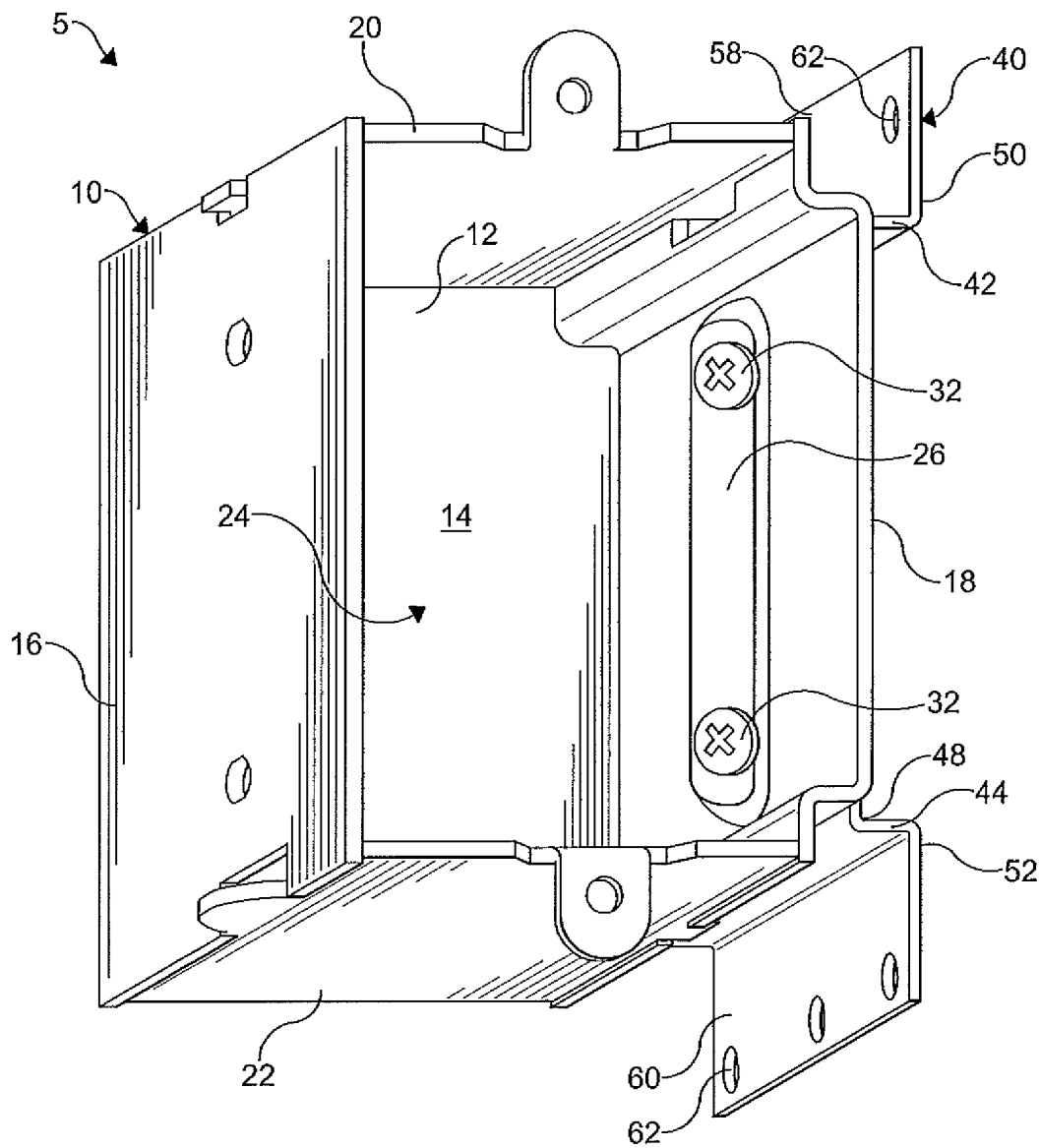
Figure 3:
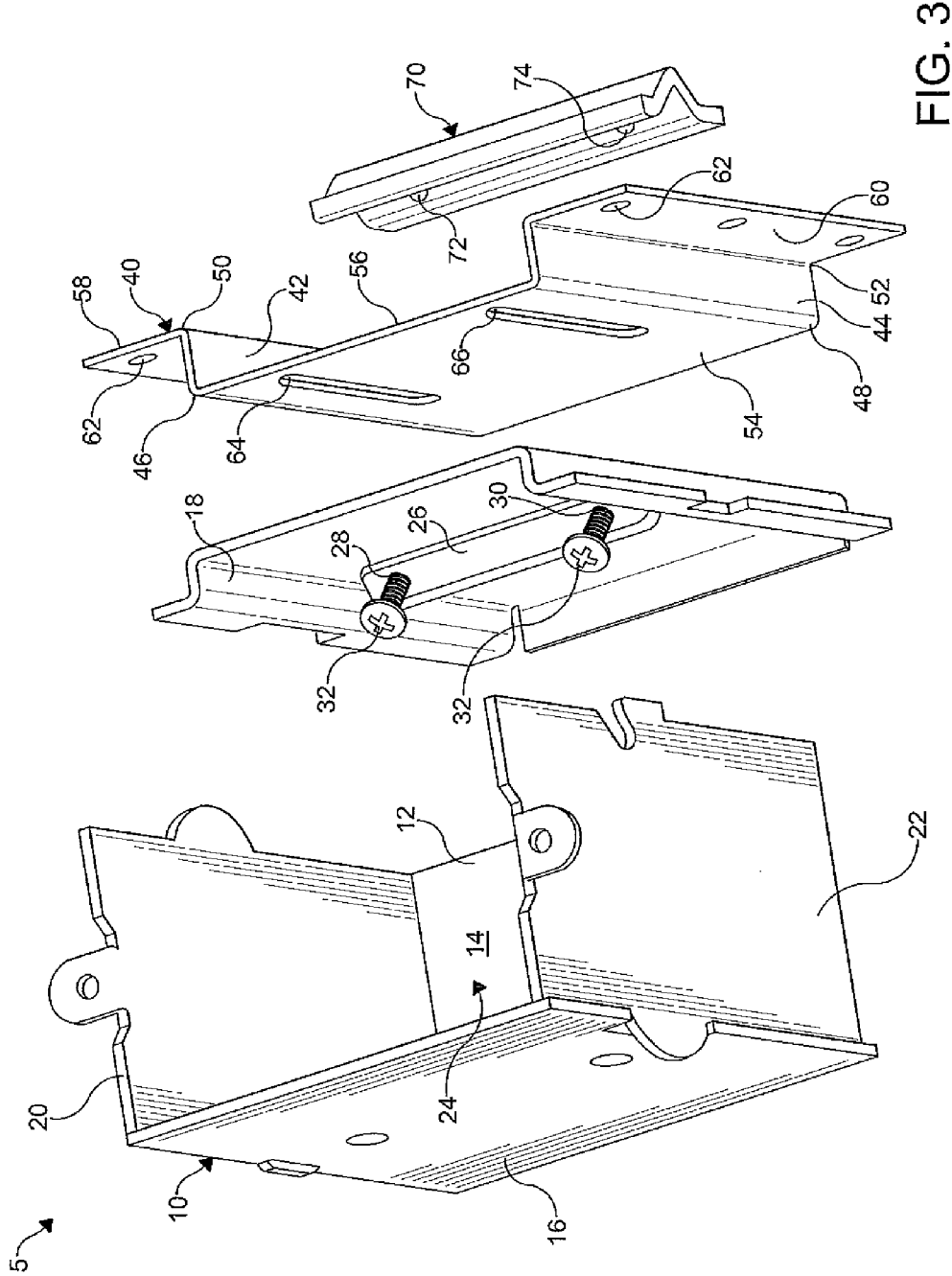
Figure 4:
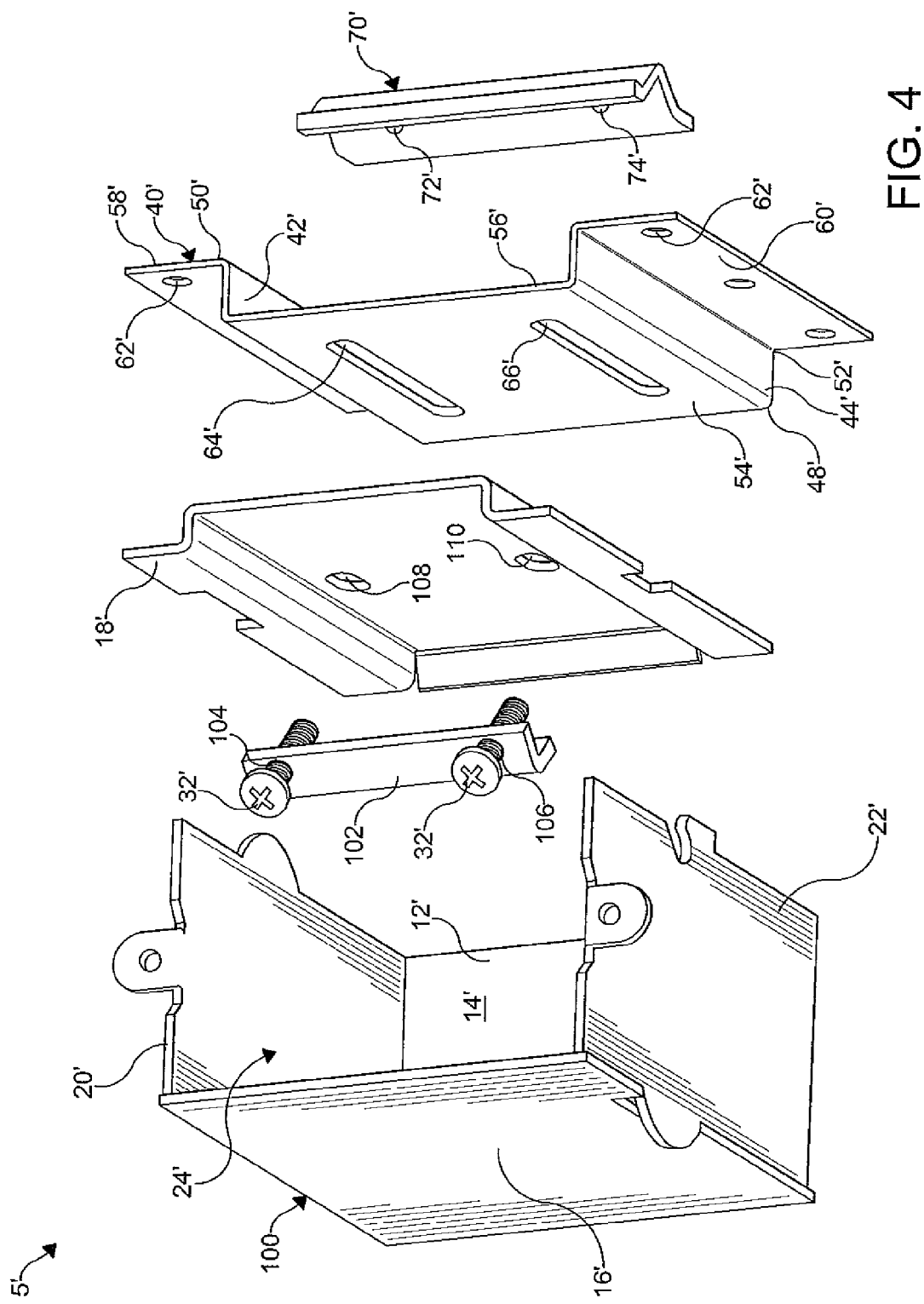

FIG. 4 illustrates an alternative embodiment of an electrical box assembly 5'. Structure similar to that illustrated in FIGS. 1-3 includes the same reference numeral and a prime (') symbol for clarity. In the embodiment shown, an electrical box assembly 100 includes an elongate fastener bar 102. As shown, the fastener bar 102 has a generally triangular cross-sectional shape although other shapes can be used. A pair of apertures 104, 106 is formed in the fastener bar 102 adjacent ends thereof. Each of the apertures 104, 106 receives a threaded fastener 32'. The apertures 104, 106 are formed in a surface of the fastener bar 102 at an angle with respect to the sidewall 18' to cause a head of the fastener 32' to extend outwardly from the fastener bar 102 generally toward the opening 24' of the electrical box assembly 100.

The sidewall 18' includes a pair of apertures 108, 110 formed therein. The apertures 108, 110 receive a threaded end of the fasteners 32' extending from the fastener bar 102. It should be understood that the apertures 108, 110 can alternately be formed in the sidewall 16'. The threaded end of the threaded fasteners 32' extends outwardly from the interior of the electrical box assembly 100, through the apertures 108, 110 and the slots 64', 66' formed in the plate 40', and is threadably received in the apertures 72', 74' formed in the clamp bar 70' to slidably attach the electrical box assembly 100 to the plate 40'. A selected rotation of the fasteners 32' in respect of the apertures 72', 74' urges the clamp bar 70' toward the fastener bar 102 resulting in a clamping force between the fastener bar 102 and the clamp bar 70' to substantially secure the electrical box assembly 100 in a desired position in respect of the plate 40'. It should be understood that the fastener bar 102, the plate 40', and the clamp bar 70' can be used as a mounting system for other electrical boxes. The remaining structure and function of the embodiment illustrated in FIG. 4 is substantially equivalent to the function and structure of the embodiment illustrated in FIGS. 1-3 previously described herein.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly comprising:
an electrical box having at least one sidewall and a front opening, the sidewall including an aperture formed therein to receive a threaded fastener;
a mounting plate adapted to be attached to a support member, the mounting plate including an elongate slot formed therein, at least a portion of the slot aligned with the aperture of the sidewall; and
a clamp bar abutting the mounting plate and having a threaded aperture formed therein, the threaded aperture formed in the clamp bar configured to receive the threaded fastener at an angle between 0 and 90 degrees relative to the at least one sidewall of the electrical box to direct a head of the fastener generally toward the opening of the electrical box, wherein the fastener extends through the aperture formed in the sidewall and the elongate slot formed in the mounting plate and is threadably received in the threaded aperture formed in the clamp bar to adjustably attach the electrical box to the mounting plate.

2. The electrical box assembly of claim 1, wherein a protuberance is formed on the sidewall, the protuberance including the aperture to receive the threaded fastener.

3. The electrical box assembly of claim 2, wherein the aperture of the protuberance is formed at an angle in respect of the sidewall to result in a head of the fastener disposed through the aperture formed in the protuberance extending outwardly from the protuberance generally toward the opening of the electrical box.

4. The electrical box assembly of claim 2, wherein the sidewall is detachable from the electrical box.

5. The electrical box assembly of claim 2, wherein the sidewall is integrally formed with the electrical box.

6. The electrical box assembly of claim 1, further comprising a fastener bar including an aperture formed therein to receive the threaded fastener, the fastener bar received in an interior of the electrical box and abutting the sidewall, wherein the aperture of the fastener bar is aligned with the aperture of the sidewall.

7. The electrical box assembly of claim 1, wherein the sidewall includes a pair of apertures formed therein, each aperture adapted to receive a threaded fastener.

8. The electrical box assembly of claim 7, wherein the mounting plate includes a pair of elongate slots formed therein, at least a portion of each slot aligned with one of the pair of apertures of the sidewall.

9. The electrical box assembly of claim 8, wherein the clamp bar includes a pair of threaded apertures formed therein, each aperture of the clamp bar aligned with one of the apertures of the sidewall, wherein each threaded fastener extends through one of the pair of apertures formed in the sidewall and one of the pair of elongate slots formed in the mounting plate and is threadably received in one of the threaded apertures formed in the clamp bar to adjustably attach the electrical box to the mounting plate.

10. An electrical box assembly comprising:
an electrical box having at least one sidewall and a front opening, the sidewall including an aperture formed therein to receive a threaded fastener;
a fastener bar including an aperture formed therein to receive the threaded fastener, the fastener bar received in an interior of the electrical box and abutting the sidewall, wherein the aperture of the fastener bar is aligned with the aperture of the sidewall;
a mounting plate adapted to be attached to a support member, the mounting plate including an elongate slot formed therein, at least a portion of the slot aligned with the aperture of the sidewall and the aperture of the fastener bar; and
a clamp bar abutting the mounting plate and having a threaded aperture formed therein, the threaded aperture formed in the clamp bar configured to receive the threaded fastener at an angle between 0 and 90 degrees relative to the at least one sidewall of the electrical box to direct a head of the fastener generally toward the opening of the electrical box, wherein the fastener extends through the aperture formed in the fastener bar, the aperture formed in the sidewall, and the elongate slot formed in the mounting plate and is threadably received in the threaded aperture formed in the clamp bar to adjustably attach the electrical box to the mounting plate.

11. The electrical box assembly of claim 10, wherein the fastener bar is formed at an angle in respect of the sidewall to result in a head of the fastener disposed through the aperture formed in the fastener bar extending outwardly from the protuberance generally toward the opening of the electrical box.

12. The electrical box assembly of claim 10, wherein the sidewall is detachable from the electrical box.

13. The electrical box assembly of claim 10, wherein the sidewall is integrally formed with the electrical box.

14. The electrical box assembly of claim 10, wherein the sidewall includes a pair of apertures formed therein, each aperture adapted to receive a threaded fastener.

15. The electrical box assembly of claim 14, wherein the mounting plate includes a pair of elongate slots formed therein, at least a portion of each slot aligned with one of the pair of apertures of the sidewall.

16. The electrical box assembly of claim 15, wherein the fastener bar includes a pair of apertures formed therein, each aperture adapted to receive the threaded fastener, wherein each aperture is aligned with one of the apertures of the sidewall.

17. The electrical box assembly of claim 16, wherein the clamp bar includes a pair of threaded apertures fanned therein, each aperture of the clamp bar aligned with one of the apertures of the sidewall, wherein each threaded fastener extends through one of the pair of apertures formed in the fastener bar, one of the pair of apertures formed in the sidewall, and one of the pair of elongate slots formed in the mounting plate and is threadably received in one of the threaded apertures formed in the clamp bar to adjustably attach the electrical box to the mounting plate.

18. An electrical box assembly comprising:
an electrical box having at least one sidewall and a front opening, the sidewall including a pair of apertures formed therein, each aperture to receive a threaded fastener;
a mounting plate adapted to be attached to a support member, the mounting plate including a pair of elongate slots formed therein, at least a portion of each slot aligned with one of the pair of apertures of the sidewall; and
a clamp bar abutting the mounting plate and having a pair of threaded apertures formed therein, each of the threaded apertures formed in the clamp bar configured to receive the threaded fastener at an angle between 0 and 90 degrees relative to the at least one sidewall of the electrical box to direct a head of the fastener generally toward the opening of the electrical box, wherein the fastener extends through one of the apertures formed in the sidewall and one of the elongate slots formed in the mounting plate and is threadably received in one of the threaded apertures formed in the clamp bar and another fastener extends through the other aperture formed in the sidewall and the other elongate slot formed in the mounting plate and is threadably received in the other threaded aperture formed in the clamp bar to adjustably attach the electrical box to the mounting plate.

19. The electrical box assembly of claim 18, wherein a protuberance is formed on the sidewall and includes the pair of apertures.

20. The electrical box assembly of claim 18, further including a fastener bar including a pair of apertures formed therein to receive the threaded fasteners, the fastener bar received in an interior of the electrical box and abutting the sidewall, wherein the apertures of the fastener bar are aligned with the apertures of the sidewall.

* * * * *